United States Patent [19]

Wodzinski et al.

[11] 4,117,304
[45] Sep. 26, 1978

[54] SHORT CIRCUITING ARC CONTROL STATION FOR MULTIPLE OPERATOR WELDING SYSTEM

[75] Inventors: Dale M. Wodzinski, York; Michael Clissa, Hanover, both of Pa.

[73] Assignee: Chemetron Corporation, Chicago, Ill.

[21] Appl. No.: 688,454

[22] Filed: May 20, 1976

[51] Int. Cl.² .............................................. B23K 9/10
[52] U.S. Cl. ................................. 219/130.1; 219/132
[58] Field of Search ................... 219/131 R, 135, 132, 219/130.1, 130.21, 130.4

[56] References Cited

U.S. PATENT DOCUMENTS

| | | | |
|---|---|---|---|
| 3,177,338 | 4/1965 | Hoffmann | 219/131 R |
| 3,253,118 | 5/1966 | Frederick | 219/131 R |
| 3,278,721 | 10/1966 | Roe | 219/131 R |
| 3,278,835 | 10/1966 | Hart | 219/131 R |
| 3,324,379 | 6/1967 | Mulder | 219/131 R |
| 3,475,585 | 10/1969 | Pierce | 219/131 R |
| 3,808,397 | 4/1974 | Wixson | 219/131 R |
| 3,851,141 | 11/1974 | Cooper | 219/132 |

*Primary Examiner*—J. V. Truhe
*Assistant Examiner*—Clifford C. Shaw
*Attorney, Agent, or Firm*—Vincent G. Gioia

[57] ABSTRACT

A control station for use with multiple operator power supplies in a semiautomatic welding system is disclosed. The system utilizes a constant-potential multiple operator unit, suitable for gas-metal arc spray transfer welding, to which control stations may be connected to provide satisfactory short-circuiting arc operation for selected operators. The control station comprises a plurality of resistors selectably connectable in specified parallel relationships through switching means and an iron core inductor to provide the required operating characteristics for short-circuit welding.

5 Claims, 3 Drawing Figures

| POSITION | CONTACT | | | | | | | | |
|---|---|---|---|---|---|---|---|---|---|
| | a | b | c | d | e | f | g | h | i |
| OFF | | | | | | | | | X |
| 1 | X | | | | | | | | |
| 2 | X | X | | | | | | | |
| 3 | X | X | X | | | | | | |
| 4 | X | X | X | X | | | | | |
| 5 | X | X | X | X | X | X | | | |
| 6 | X | X | X | X | X | X | X | | |

SHORT CIRCUITING ARC CONTROL STATION FOR MULTIPLE OPERATOR WELDING SYSTEM

BACKGROUND OF THE INVENTION

The present invention relates, in general, to multiple operator, semiautomatic welding systems, and more particularly to systems capable of handling two different types of welding operations from a single power supply.

Multiple operator welding power sources, which serve from a single power supply a plurality of welding operators using stick electrodes, have been well known for many years. Such systems eliminate the necessity of having separate power sources at each welding location by providing individual resistor grids linked to one central power supply. A constant potential power supply is placed at a central location convenient to all of the operators, with only the individual resistor grids, associated cables, and electrode holders, being at the work site. The resistor grids each comprise a tapped series resistor box convenient to the operator who selects the desired welding current for his particular job. Such systems have provided real savings in both time and effort for those who use, store, and transport such equipment, for a single multiple-operator power source with several small resistance control grids is lighter, smaller, less cumbersome and less expensive to install and operate than the equivalent number of power supplies formerly used.

Early attempts to design constant potential multiple operator units for use with gas-metal arc welding; i.e., arc welding utilizing a gas-shielded consumable electrode, had several shortcomings, particularly when used in the semiautomatic, operator-held mode. First, the fluctuations in the main line voltages caused undesirable arc voltage drift, and second, the switching on and off of other arcs caused further undesirable arc voltage disturbances. Recent improvements have resulted in power sources which are capable of usage by multiple operators, while minimizing arc voltage disturbances and drift to provide satisfactory results in gas-metal arc welding with either solid or fluxcored wires. For successful use of the multiple operator concept, however, it is necessary that all arcs operate satisfactorily from the power supply unit, and this has created a difficulty in that the presently available power supplies lack the versatility required for application to short-circuiting arc operations, wherein the arc is characterized by a series of repetitive short circuits between the consumable electrode wire and the workpiece.

SUMMARY OF THE INVENTION

It is, therefore, an object of the present invention to provide a multiple operator welding system which is suitable for gas-metal arc spray transfer welding operation, simultaneously with short-circuiting arc welding operations.

In accordance with this invention, a conventional constant-potential multiple operator power supply unit is provided, having an output voltage suitable for one or more required transfer spray arc operations. This output voltage, which typically may be adjustable between 22 and 44 volts, is higher than that required for most short-circuiting arc operations, but in accordance with the present invention is connected through an arc control station wherever short-circuiting arcs are required. The control station lowers the voltage to a level satisfactory for short-circuiting arc operations by providing a plurality of voltage steps which permit selection of a voltage 4.5 to 12 volts less than the output voltage setting for the multiple operator power supply unit. Preferably the output of the arc control station is adjustable in nominal 1.5 volt steps. In addition, the output of the control station may be set to output voltage level of the multiple operator power supply unit when spray transfer operation is desired at that particular operator location.

The arc control station includes a network of resistors, selected ones of which may be connected in parallel by means of the contacts of a seven-position selector switch. This is operable to connect selected resistors between the input and output terminals of the control station to permit selection of the voltage level to be applied to the arc welding. An iron core inductor is connected in series with the resistor network to reduce current fluctuations in the short-circuit arc.

BRIEF DESCRIPTION OF THE DRAWINGS

The foregoing and addition objects, features and advantages of the present invention will become apparent to those of skill in the art from a consideration of the following detailed description of a preferred embodiment thereof and the appended claims, taken in conjunction with the accompanying drawings, in which:

Description of a Preferred Embodiment

Figure 1:
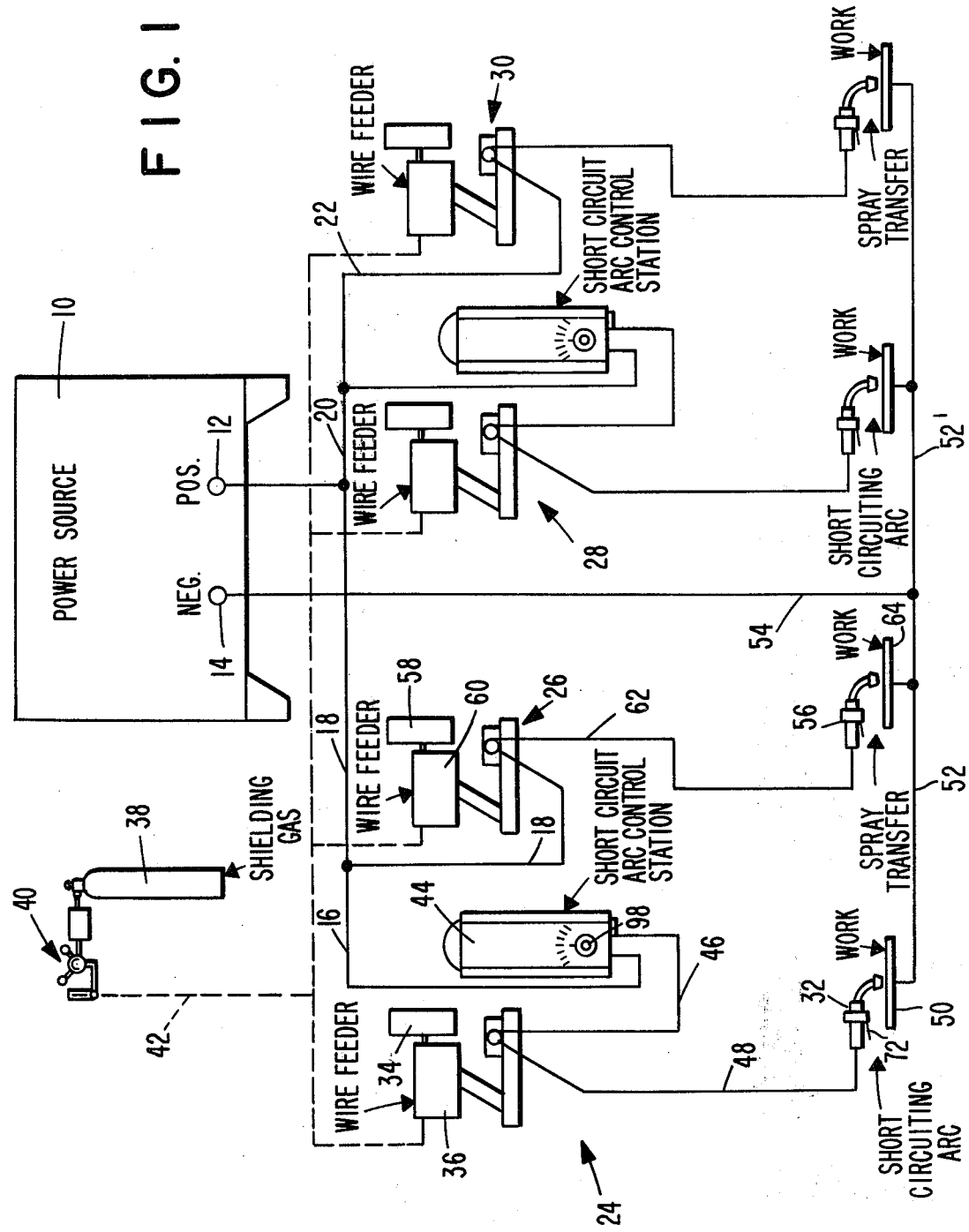
FIG. 1 is a diagrammatic illustration of the system of the present invention.

Turning now to a more detailed description of the present invention, reference is first made to the diagrammatic illustration of FIG. 1, which discloses a multiple operator welding system adapted for both spray transfer and short-circuiting arc welding, each from one or more operator stations. The system is supplied by a power source 10, which preferably is a conventional multioperator power supply such as the M-O Power Source Model GMA 800, Stock No. 200128-82, available from the Welding Products Division of Chemetron Corporation, 111 East Wacker Drive, Chicago, Illinois 60601. Power supply 10 produces on its output terminal 12 a substantially constant positive voltage which may be at a selected value between 22 and 44 volts, for example, while output terminal 14 is the system reference, or ground. The particular power supply listed above is capable of supplying 800 amperes on a continuous basis.

Welding current is supplied by way of cables 16, 18, 20 and 22 to a plurality of operator stations; in this case, four operator stations 24, 26, 28 and 30 are illustrated but it will be apparent that additional parallel operator stations may be connected to output 12 by means of suitable cables, which outputs will duplicate one or the other of the stations herein described.

To illustrate the versatility of the present system, as opposed to prior systems, FIG. 1 shows two different types of welding stations, which types have been incompatible in prior multiple-operator systems. Thus, stations 24 and 28 are short-circuiting arc welding stations, while 26 and 30 are the gas-metal arc spray transfer type.

As diagrammatically illustrated, the equipment at operator station 24 includes a semiautomatic, operator-controlled welding gun 32 which is of conventional construction and which receives an electrode wire drawn from a supply spool 34 driven by a feed control motor 36. A suitable shielding gas is fed from a supply tank 38 through suitable valves 40 and a gas supply line 42 to the electrode feeding mechanism and thence through the welding gun in a well known manner to provide a gas shield around the welding arc. The welding gun in connected to the power source 10 by way of cable 16, a short-circuit arc control station 44 to be described, and cables 46 and 48. The exact manner of connecting the power carried by cable 46 to the welding gun is a matter of choice, and is conventional in the art. Current flow from the power source arcs across the space between the welding electrode in gun 32 and a workpiece 50 which is connected to the ground terminal 14 of power source 10 by way of cable 52 and 54, whereby station 24 is connected across the terminals of source 10.

Station 26 is a conventional semiautomatic spray transfer welding station comprising a hand-held welding gun 56, an electrode supply spool 58 driven by a wire feeder motor 60, a gas supply conduit 42, and the power supply cables 18 and 62. The cable 62 permits motion of the hand-held gun 56 and supplies the required welding current to the electrode in the gun (not shown) which current flows through the welding arc to the workpiece 64 and thence through cables 52 and 54 to the ground terminal 14. Thus, the station 26 is also connected directly across the positive and negative power source terminals, in parallel with station 24, but differs from the short-circuiting arc station 24 in that the latter includes the short-circuit arc control station 44.

Welding station 28 is substantially identical to station 24, while station 30 is substantially identical to station 26, and these additional stations are connected by way of cables 20 and 22 to cable 52′ and cable 54 for connection in parallel across the positive and negative terminals 12 and 14 of the power source 10. Additional stations may similarly be connected in parallel across these terminals up to the power capability of the source.

Figures 2, 3:
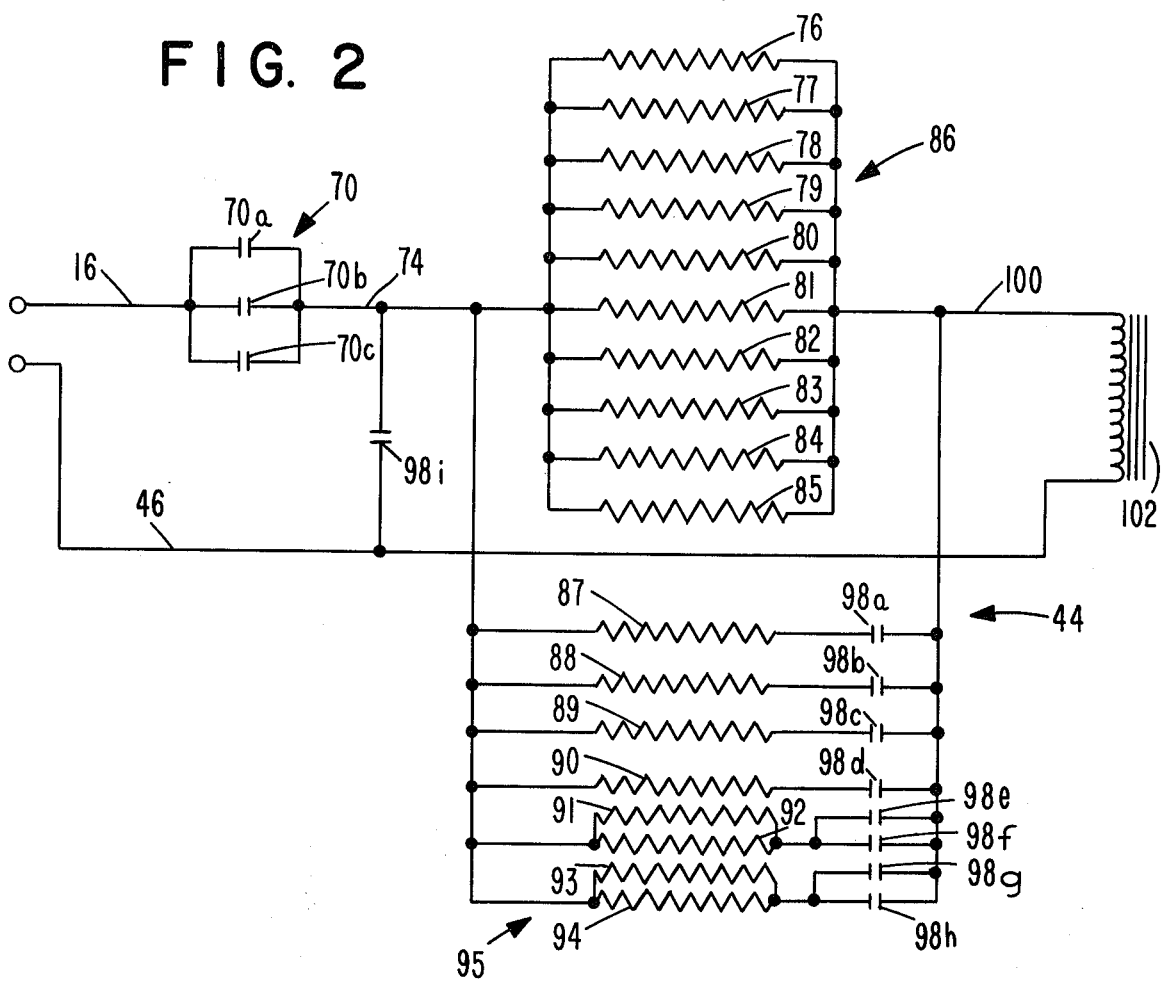
FIG. 2 is a schematic diagram of the control station of FIG. 1.
FIG. 3 is a diagram of the switch contact closure sequence for the control station of FIG. 2.

As indicated above, the spray transfer welding operation requires a different voltage level for efficient, effective operation than does the short-circuiting arc system, and accordingly the short-circuit arc control station 44 is required. This control station is illustrated in FIG. 2, which reference is now made. As may be seen in this figure, the input line 16 leading to the short circuit control station 44 is connected through a solenoid-operated main power contactor 70, shown as having three parallel contacts 70a, 70b, and 70c connected in line 16. These contacts are operated under the control of the welder by means of a suitable switch, diagrammatically illustrated at 72 in FIG. 1, which may be manually closed to activate a solenoid in station 44 when the welding operation is to start. Activation of switch 72 and its associated solenoid (not shown) therefore closes contacts 70a – 70c to supply current to the control station 44 by way of line 74.

Connected in series with line 74 is the parallel combination of resistors 76 – 85, each of which is a Nichrome wire wound resistor, of 0.545 ohms in the preferred embodiment, resistors 76 – 85 forming a first resistor grid 86.

Selectively connectable in parallel with grid 86 are a plurality of resistors 87 – 94, constituting a second resistor grid 95. The resistors of grid 95 are connectable in selective combinations by means of a switch, such as rotary switch 98 illustrated in FIG. 1, having eight contacts 98a – 98h connected in series with various resistors 87 – 94. The switch has seven positions and operators to close selected contacts either singly or in combinations to place selected resistors from grid 95 in parallel with grid 86. Thus, contact 98a is connected in series with resistor 87, contact 98b is in series with resistor 88, contact 98c is in series with resistor 89 and contact 98d is in series with resistor 90. Resistors 91 and 92 are connected in parallel to each other and this parallel arrangement is connected in series with the parallel arrangement of contacts 98e and 98f. Similarly, resistors 93 and 94 are connected in parallel with each other and in series with the parallel connection of contacts 98g and 98h.

Grid 95 and its corresponding switch contacts 98a–98h are connected in parallel with grid 86, the two grids being connected between line 74 on one side and line 100 on the other. Line 100 is connected to an iron core inductor 102 which provides inductance for the short-circuiting arc, thereby providing a control of the dynamic characteristics of the arc current by limiting the rate of rise of the current during the repetitive short circuits which characterize short circuit arc welding. Inductor 102 is connected by way of cables 46 and 48 to the welding electrode, as illustrated in FIG. 1.

In a typical control station, resistors 87 and 88 each may have a value of 0.413 ohms, resistors 89 and 90 each may have a value of 0.209 ohms, and resistors 91 – 94 may have values of 0.164 ohms. The connection of these resistors in various combinations across resistors 76 – 85 provide the required current to line 46 for proper operation of the short circuiting welding electrode. To provide the six 1 178 steps mentioned above for reducing the power source voltage 4 ½ to 12 volts less than the nominal voltage, the selector switch 98 operates the various contacts 98a – 98h in the manner illustrated in FIG. 3. Thus, the seven position switch 98 has an "off" position wherein none of the contacts are closed and six "on" positions wherein various combinations of contacts are closed, as indicated in the figure. The marked blocks on the FIG. 3 chart indicate a closed contact, and the unmarked blocks indicate an open contact; thus when the switch is at the "off" position, the resistor grid 95 is not connected across grid 86. In the other six positions of switch 98, various resistors in grid 95 are connected in parallel with grid 86, as indicated.

In the "off" position of switch 98, an additional contact 98i may be activated to bypass the resistor grids 86 and 95. This bypass contact enables the selector switch to select the output voltage level of power source 10 whenever it is desired to use a spray transfer operation at the particular operator station, instead of the short circuit welding. Although contact 98i may be operable by selector switch 98, in the alternative it may be a separately actuated switch for manual actuation by the operator when a changeover from one type of welding to another is desired. Where it is anticipated that only spray transfer type welding is to be used at a given operator station, such as at stations 26 and 30 illustrated in FIG. 1, the arc control station 44 may be omitted, thus reducing the cost of the equipment at that particular station.

Thus there has been described a multiple operator, semiautomatic welding system capable of supplying power not only to gas-metal spray transfer stations but also to operator stations utilizing short-circuiting arc welding, and drawing current from the same power source. In the latter case, the short-circuiting arcs are supplied through a short-circuit arc control station which reduces the voltage level of the power source to a selected level to facilitate short-circuit arc welding. Although the invention has been described in terms of a particular embodiment, it will be understood that variations and modifications can be made without departing from the true spirit and scope of the invention as described in the accompanying claims.

What is claimed is:

1. A welding system for providing welding current to both gas-metal arc spray transfer stations and short-circuiting arc stations from a single source of supply, comprising:
    a common power source providing direct current power at a substantially constant potential, said potential being selected to accommodate the requirements of spray transfer welding but being unsuitable for short-circuiting arc welding;
    a first operator station including a spray transfer welding gun and wire feeder means for supplying welding wire thereto;
    first cable means connecting said spray transfer welding gun directly to said common power source to provide direct current power for spray transfer welding;
    a second operator station including a short-circuiting welding gun and wire feeder means for supply welding wire thereto;
    a short circuit arc control unit at said second operator station for selectively reducing the direct current potential of said common power source for said second operator station said arc control unit comprising an input and an output, a first resistor grid comprising a plurality of parallel-connected resistors connected in series between said input and output, a second resistor grid comprising a plurality of resistors, switch means in series with each resistor of said second resistor grid and selectively operable to connect selected resistors of said second resistor grid in parallel with said first resistor grid, and reactive means connected in series with said first resistor grid between said input and said output; whereby voltage disturbances from one of said operator stations are effectively isolated from the other of said operator stations; and
    second cable means connecting said arc control unit in series between said commmon power source and said short-circuiting welding gun, said first and second operator stations being connected in parallel with each other across said common power source.

2. The welding system of claim 1, wherein said reactive means comprises an inductor for reducing current fluctuations in said second operator station due to the operation of said short-circuiting welding gun.

3. The welding system of claim 1, wherein said switch means for connecting selected resistors in parallel with said first resistor grid comprises a selector switch having openable and closable contacts in series with each of the resistors of said second grid, whereby operation of said switch closes selected contacts to connect corresponding resistors in parallel with said first resistor grid.

4. The welding system of claim 3, further including main contactor means in series with said input and output for opening the electrical circuit through said arc control station.

5. The welding system of claim 4, further including bypass means for bypassing said arc control station to permit said additional operator station to operate in the spray transfer welding mode at the potential of said common power source.

* * * * *